Figure 1:
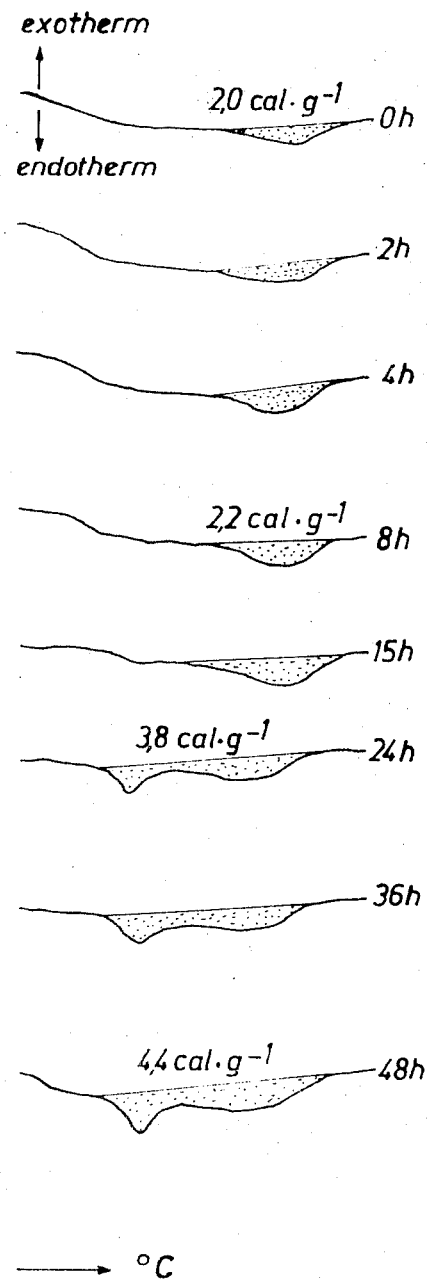

United States Patent [19]

Stieler et al.

[11] 3,859,245

[45] Jan. 7, 1975

[54] PROCESS FOR THE PRODUCTION OF POLYCARBONATE SOLUTIONS

[75] Inventors: Werner Stieler; Rolf Oelmeyer; Heinrich Haupt; Hugo Vernaleken, all of Krefeld, Germany

[73] Assignee: Bayer Aktiengesellschaft, Leverkusen, Germany

[22] Filed: Feb. 16, 1973

[21] Appl. No.: 333,158

[30] Foreign Application Priority Data

Feb. 17, 1972 Germany............................ 2207360

[52] U.S. Cl............................ 260/34.2, 260/33.8 R
[51] Int. Cl........................ C08g 53/00, C08g 51/30
[58] Field of Search........ 260/47 X A, 33.8 R, 34.2; 264/341, 343

[56] References Cited
UNITED STATES PATENTS 3,028,365  4/1962  Schnell et al. .................. 260/33.8 R
3,541,200  11/1970  Niegisch ....................... 260/47 X A
3,622,538  11/1971  Green ........................... 260/47 X A

*Primary Examiner*—Morris Liebman
*Assistant Examiner*—S. L. Fox
*Attorney, Agent, or Firm*—Plumley & Tyner

[57] ABSTRACT

The invention is related to the production of the solution of a high molecular weight polycarbonate having a molecular weight above 30,000 suitable for the production of films and filaments. The process comprises subjecting the solid polycarbonates solutions obtained by solvent removal from polycarbonate solutions at temperatures below the melting point of said polycarbonate coupled with the application of shear energy for 0.1 to 50 hours to a solvent atmosphere of solvents which are able to dissolve polycarbonates and subsequently redissolving the thus obtained products.

6 Claims, 4 Drawing Figures

PROCESS FOR THE PRODUCTION OF POLYCARBONATE SOLUTIONS

This invention relates to a process for the production of polycarbonate solutions which are particularly suitable for the production of filaments and films having good mechanical properties.

Polycarbonates based on aromatic dihydroxy compounds have outstanding properties which enable them to be used inter alia as starting materials for the production of films and filaments.

Unfortunately, the mechanical properties and the service properties of these polycarbonate films and filaments, which are advantageously prepared by casting and wet-spinning, respectively, depend largely upon the degree of crystallinity which can be achieved in the films and filaments after stretching.

In the case of polymers which contain, for example, polar groups and which hence show a marked tendency towards crystallisation, such as polyamides or even polyethylene glycol terephthalate, the starting materials for the films and fibres do not require any special pretreatement. After a stretching process, these films and filaments show service properties.

By contrast, a number of polymers, including polycarbonates, show a pronounced tendency towards crystallisation. However, there are several measures by which their crystallisation behaviour can be improved. For example, crystallisation promoters can be added to the solutions from which the films and filaments are prepared. In another process for improving crystallinity for polycarbonate films and fibres, polycarbonate solutions are converted into solid solutions by removal of the solvent at temperatures below the melting point of the polycarbonates used, coupled with the application of shear energy (cf. DOS No. 2,004,517). The films and filaments prepared from these solutions by conventional processes shown increased crystallinity and mechanical properties which, although improved are still not completely satisfactory. In particular, their tensile strength is in need of improvement.

It has now surprisingly been found that the crystalline component in films and filaments of high molecular weight polycarbonate based on aromatic dihydroxy compounds and hence the mechanical properties and service properties of these films and filaments can be considerably increased by leaving solid polycarbonate solutions, obtained in accordance with DOS No. 2,004,517 by solvent removal at temperatures below the melting points of the polycarbonates coupled with the application of shear energy, in a solvent atmosphere consisting of solvents which are able to dissolve the polycarbonates for periods of from 0.1 to 50 hours.

Accordingly, the present invention relates to a process for the production of a solution of a high molecular weight polycarbonate having a molecular weight above 30,000, suitable for the production of films and filaments, which comprises subjecting the solid polycarbonate solutions obtained by solvent removal from polycarbonate solutions at temperatures below the melting point of said polycarbonate coupled with the application of shear energy for 0.1 to 50 hours to a solvent atmosphere of solvents which are able to dissolve polycarbonates optionally in admixture with water vapour and subsequently redissolving the thus obtained products.

Suitable solvents for this process are the solvents normally used for polycarbonate for example, chlorinated aliphatic hydrocarbons and chlorinated aromatic solvents. Solvents with a high vapour pressure at room temperature have proved to be particularly suitable. Particularly good examples of such solvents are methylene chloride, chloroform and 1,2-dichloroethane.

The particularly advantageous effect of solvent conditioning on the crystallisation behaviour of the solid polycarbonate solutions is surprising.

It is conceivable that there is a reduction in the second-order transition temperature of the solid polycarbonate solutions under the effect of the solvents so that, due to the increased lability of the molecules, close-order zones are developed in the solid solutions. These close-order zones remain intact even after redissolution. A good indication of this hypothesis is to measure the molecular weights by the light-scattering method according to which molecular weights some 4 to 5 times higher were found in solutions of conditioned, solid polycarbonate solutions by comparision with unconditioned polycarbonate solutions. This effect is not observed where molecular weight is determined by the solution viscosity method. Accordingly, the scattering of light provides an indication of the pressure of associated molecules in solution. Accordingly, it is also probable that seed formation is likely to take place at a high rate in the spinning process used for the polycarbonates treated in accordance with the invention. This is reflected in a better crystallised fibre with better mechanical and thermal properties. Resistance to solvents is also influenced with particular advantage in this way.

Another important physical analysis method for characterising the morphological changes in the polycarbonates induced by conditions is differential thermoanalysis (DTA).

Figure 2:
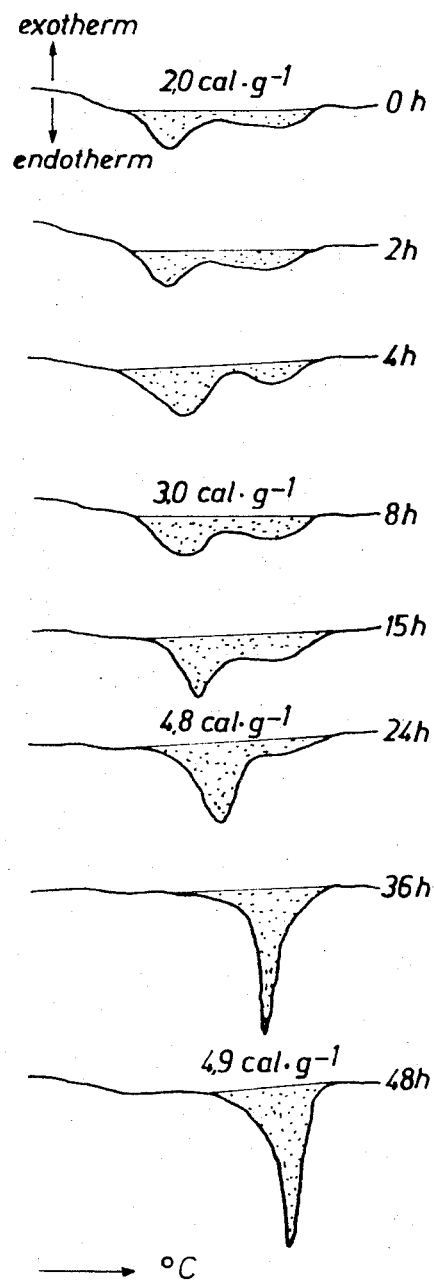

FIGS. 1 and 2 illustrate the influence of the contact time of methylene chloride vapour (FIG. 1) and of a mixture of methylene chloride and water vapour (FIG. 2) upon the degree of crystallisation (expressed by the fusion enthalpy) and upon the position of the melting range of conditioned polycarbonates.

Suitable processes and apparatus for conditioning solid polycarbonate solutions obtained in accordance with DOS No. 1,004,571, include for example treatment with solvent vapour in a fluidised bed or tumbler vessel.

In order to obtain uniform, effective conditioning, it is advantageous to carry out the treatment in a flowing atmosphere. Treatment can be carried out either batchwise or even continuously.

Figure 3:
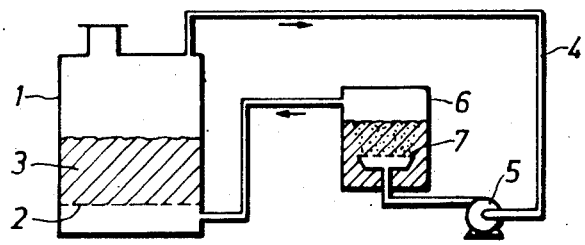

FIG. 3 shows one embodiment of an apparatus for carrying out the conditioning process described above. The solid product 3 is accommodated in granular form in a container 1 with a perforated base 2. The apparatus is provided with a recycle pipe 4, a blower 5 and a bubble moistener 6 filled with solvent 7. The degree of saturation of the vapours with which the product is rinsed can be adjusted by suitably selecting the temperatures in the treatment vessel 1 and in the bubble moistener 6.

Suitable polycarbonates are those based on aromatic dihydroxy compounds for example, hydroquinone, resorcinol, 4,4'-dihydroxy diphenyl-2,2-propane, bis-(4-hydroxyphenyl)-alkanes, -cyclo alkanes, -ethers, -sulphides, -sulphones, -ketones, also nuclear-halogenated bisphenols and α,α'-(bis-p-hydroxyphenyl)-p-diisopropyl benzene which are obtained in conventional manner by reacting the bisphenols with polycarbonate-forming derivatives of carbonic acid. In order to obtain films and filaments of good quality, the molecular weights should be above 30,000, preferably above 50,000.

By "conditioning" the solid polycarbonate solutions by the process according to the invention, it is possible to obtain polycarbonate solutions which can be processed into films and filaments showing distinctly improved crystallisation. The process according to the invention is technically simple and can be carried out with little outlay. It can be carried out after the process described in DOS No. 2,004,517, in which case both stages represent one unit.

The solutions obtained in accordance with the invention can then be processed into filaments and films by conventional methods.

The following Examples are to further illustrate the invention without limiting it.

EXAMPLE 1

Figure 4:
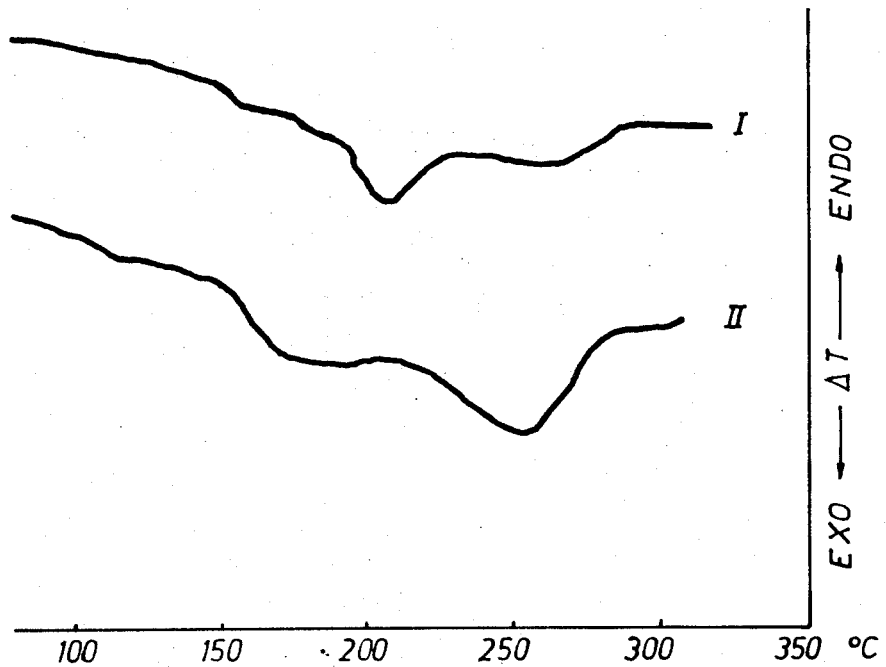

A polycarbonate based on 4,4'-dihydroxy diphenyl-2,2-propane with a molecular weight of 120,000 is precrystallised in a two-shaft screw under shear stress in accordance with DOS No. 2,004,517. The screw has a shaft diameter of 32 mm, a shaft length of 1,140 mm, a thread lead of 12 mm, a thread depth of 4 mm, a free cross section in the vapour tower of 220 cm² and is equipped with a two speed gear box. The rotational speed of the screw varies between 170 and 180 rpm. At a screw barrel temperature of 100°C, 2.4 kg per hour of polycarbonate, in the form of a 15 percent solution in methylene chloride, are concentrated by evaporation up to a residual solvent content of approximately 5 percent, which uses 0.19 KWh of mechanical energy per kg of polycarbonate. The maximum product temperature is 100°C. The crystallinity of this polycarbonate can be read off from the DTA curve I in FIG. 4. The heat of fusion $\Delta H_S$, determined as a calibrated surface over the fusion maximum at 207°C amounts to 1.5 cal/g. Some of this product is spun. The properties measured on stretched filaments are set out in Table 1, column I.

Another batch of the pretreated polycarbonate is filled into a container and rinsed for 48 hours with air saturated with methylene chloride vapour. The polycarbonate undergoes post-crystallisation over this period. The increase in crystallisation is shown in the curve II (FIG. 4) of the DTA. The heat of fusion $\Delta H_S$ now amounts to 2.9 cal/g, the fusion maximum is at 254°C.

If conditioning is carried out in the absence of methylene chloride, i.e., simply by rinsing with air, there is no increase either in the heat or fusion $\Delta H_S$ or in the fusion maximum.

Table 1

| characteristics | I | II |
| --- | --- | --- |
| individual denier (dtex) | 3.6 | 3.6 |
| strength (g/dtex) at 20% elongation | 2.34 | 3.02 |
| interference width (degrees) of the X-ray diagram | 1.40 | 1.10 |
| crystalline fraction(%) from X-ray measurements trichlorethylene-induced | 11 | 19 |

Table 1-Continued

| characteristics | I | II |
| --- | --- | --- |
| shrinkage (%) 30 minutes at 20°C | 28 | 12 |

I filaments of unconditioned polycarbonate.
II filaments of conditioned polycarbonate.

EXAMPLE 2

A polycarbonate precrystallised in the two-shaft screw in accordance with Example 1 is stored in a methylene chloride atmosphere at 25°C, whilst a second sample is stored over a mixture of methylene chloride and water (1 : 1). The increase in the crystallinities (hatched areas) of these sample is shown as a function of the storage time in FIGS. 1 and 2. Crystallinity increased with residence time. At the same time, the melting range is displaced.

EXAMPLE 3

Nine samples of polycarbonate pretreated in accordance with Example 1 are conditioned for 5 hours at 25°, 30° and 40°C in methylene chloride atmospheres differing in their relative methylene chloride moistures (10,50,100 %). The crystallinities obtained, determined as fusion enthalpies $\Delta H_S$ (cal/g) are shown in Table 2 below.

Table 2

| Sample | Temperature °C | Relative methylene chloride moisture in % | Fusion enthalpy $H_S$ (cal/g) |
| --- | --- | --- | --- |
| 1 | 25 | 10 | 2.4 |
| 2 | 25 | 50 | 2.6 |
| 3 | 25 | 100 | 4.0 |
| 4 | 30 | 10 | 2.2 |
| 5 | 30 | 50 | 2.5 |
| 6 | 30 | 100 | 4.2 |
| 7 | 40 | 10 | 2.0 |
| 8 | 40 | 50 | 2.4 |
| 9 | 40 | 100 | 3.5 |

EXAMPLE 4

A copolycarbonate based on 99 mol percent of 4,4'-dihydroxy diphenyl-2,2-propane and 1.0 ml percent of 1,4-bis-(4'-hydroxy phenyl isopropylidene)-benzene with a molecular weight of 115,000, pretreated in accordance with Example 1, is conditioned for 48 hours at 25°C in a methylene chloride atmosphere. The fusion enthalpy is increased by the methylene chloride treatment from 3.4 cal/g to 6.2 cal/g.

EXAMPLE 5

A polycarbonated with a fusion enthalpy $\Delta H_S$ of 1.5 cal/g, pretreated in the two-shaft screw in accordance with Example 1, is conditioned for 24 and 48 hours at room temperature in a solvent atmosphere.

The increase in fusion enthalpy obtained by this treatment with the individual solvents is shown in Table 3.

Table 3

| Solvent | Fusion enthalpy [cal/g] treatment time | |
| --- | --- | --- |
|  | 24 hours | 48 hours |
| carbon tetrachloride | 2.1 | 2.1 |
| ethylene chloride | 4.6 | 4.6 |
| chloroform | 2.5 | 2.6 |
| ethyl acetate | 2.8 | 3.1 |
| chlorobenzene* | 3.6 | 3.3 |

* Where chlorobenzene is used the treatment temperature is 50°C.

We claim:

1. A process for the production of a solution of a high molecular weight polycarbonate having a molecular weight above 30,000 and an increased crystallinity, suitable for the production of films and filaments, which comprises (1) preparing a solid polycarbonate solution by removing solvent from a solution of a polycarbonate, derived from an aromatic dihydroxy compound, at a temperature below the melting point of said polycarbonate while applying shear energy to said polycarbonate, (2) subjecting said solid polycarbonate solution over a period of 0.1 to 50 hours to an atmosphere of a solvent for said polycarbonate, (3) recovering said polycarbonate with an increased crystallinity, and (4) redissolving said polycarbonate with an increased crystallinity.

2. A process as claimed in claim 1, wherein methylene chloride is used as the solvent.

3. A process as claimed in claim 1, wherein a polycarbonate based on 4,4'-dihydroxy-diphenyl-2,2-propane is used as the high molecular weight polycarbonate.

4. A process as claimed in claim 1, wherein a copolycarbonate based on 95 to 99.8 mol parts of 4,4'-dihydroxy-diphenyl-2,2-propane and 5 to 0.2 mol parts of 1,4-bis-(4'-hydroxyphenyl-isopropylidene)-benzene is used as the high molecular weight polycarbonate.

5. The process of claim 1 wherein said atmosphere is a mixture of solvent and water-vapor.

6. The process of claim 1 wherein said solid polycarbonate solution, in the form of a fluidized bed of granular material, is subjected to a flowing stream of solvent.

* * * * *